(12) United States Patent
Chang

(10) Patent No.: US 10,452,215 B2
(45) Date of Patent: Oct. 22, 2019

(54) MUTUAL CAPACITIVE FORCE SENSOR AND TOUCH DISPLAY DEVICE WITH FORCE SENSING FUNCTION AND FORCE SENSING METHOD THEREOF

(71) Applicant: ILI TECHNOLOGY CORP., Hsinchu County (TW)

(72) Inventor: Hu-Chi Chang, Hsinchu Hsien (TW)

(73) Assignee: ILI TECHNOLOGY CORP., Hsinchu County (TW)

(*) Notice: Subject to any disclaimer, the term of this patent is extended or adjusted under 35 U.S.C. 154(b) by 63 days.

(21) Appl. No.: 15/668,841

(22) Filed: Aug. 4, 2017

(65) Prior Publication Data

US 2018/0059823 A1 Mar. 1, 2018

(30) Foreign Application Priority Data

Aug. 31, 2016 (TW) .............................. 105128033 A

(51) Int. Cl.
*G06F 3/044* (2006.01)
*G06F 3/041* (2006.01)
*G01L 1/14* (2006.01)

(52) U.S. Cl.
CPC .............. *G06F 3/044* (2013.01); *G01L 1/146* (2013.01); *G06F 3/0416* (2013.01); *G01L 1/14* (2013.01); *G06F 2203/04104* (2013.01)

(58) Field of Classification Search
CPC . G01L 1/14; G01L 1/146; G06F 2203/04104; G06F 3/0416; G06F 3/044
See application file for complete search history.

(56) References Cited

U.S. PATENT DOCUMENTS

2017/0322662 A1* 11/2017 Hsieh .................. G02B 6/0088

* cited by examiner

*Primary Examiner* — Temesghen Ghebretinsae
*Assistant Examiner* — Sosina Abebe
(74) *Attorney, Agent, or Firm* — JCIPRNET

(57) ABSTRACT

A touch display device with a force sensing function is provided. The touch display device includes a touch display panel, a backlight circuit and a force sensor. The backlight circuit is disposed on a back surface of the touch display panel. The force sensor includes a first conductive layer, a second conductive layer, an insulation layer and a third conductive layer. The first conductive layer is disposed between the touch display panel and the backlight circuit, the second conductive layer is disposed between the first conductive layer and the backlight circuit, and the insulation layer is disposed between the first conductive layer and the second conductive layer. The backlight circuit is disposed between the second conductive layer and the third conductive layer. The first conductive layer, the second conductive layer and the third conductive layer are electrically insulated from one another.

18 Claims, 7 Drawing Sheets

MUTUAL CAPACITIVE FORCE SENSOR AND TOUCH DISPLAY DEVICE WITH FORCE SENSING FUNCTION AND FORCE SENSING METHOD THEREOF

This application claims the benefit of Taiwan application Serial No. 105128033, filed Aug. 31, 2016, the subject matter of which is incorporated herein by reference.

BACKGROUND OF THE INVENTION

Field of the Invention

The invention relates in general to a mutual capacitive force sensor, and a touch display device supporting force sensing and a force sensing method thereof, and more particularly, to a mutual capacitive force sensor, and a touch display device having a force sensing function and a force sensing method thereof capable of sensing a multi-point press.

Description of the Related Art

With the progress of technologies, touch control technologies are extensively applied in various types of consumer electronic products, e.g., smart phones, in-vehicle touch screens, and portable electronic products such as laptop computers. Types of currently developed touch control technologies are also becoming more diversified, e.g., resistive, capacitive, optical and electromagnetic touch control. All of these types detect a position of a finger or a stylus touching an electronic device to allow the electronic device to perform a corresponding instruction according to the detected touch position. Thus, a user may then perform a desired function through touch control. However, in current touch panels, only one single instruction can be performed according to a touch position. A further instruction related to the single instruction cannot be performed together in a one-time touch operation. That is, for a user, the above solution fails in requirements of satisfying better efficiency of human-machine interactions and more intuitively expressing an intention to an electronic device.

SUMMARY OF THE INVENTION

The invention is directed to a mutual capacitive force sensor, and a touch display device supporting force sensing and a force sensing method thereof, so as to allow a user to perform multiple instructions in a one-time touch operation to increase the number of intuitively achievable functions for the user.

To achieve the above object, the present invention provides a touch display device having a force sensing function. The touch display device includes a touch display panel, a backlight circuit and a force sensor. The touch display panel includes a display surface and a back surface that are opposite each other. The backlight circuit is disposed on the back surface. The force sensor includes a first conductive layer, a second conductive layer, an insulation layer and a third conductive layer. The first conductive layer is disposed between the touch display panel and the backlight circuit. The second conductive layer is disposed between the first conductive layer and the backlight circuit. The insulation layer is disposed between the first conductive layer and the second conductive layer. The backlight circuit is disposed between the second conductive layer and the third conductive layer. The first conductive layer, the second conductive layer and the third conductive layer are electrically insulated from one another.

To achieve the above object, the present invention further provides a mutual capacitive force sensor, which includes a first conductive layer, a second conductive layer, an insulation layer, a third conductive layer and a compressible dielectric layer. The first conductive layer includes a plurality of first electrode strips. The second conductive layer includes a plurality of second electrode strips that intersect the first electrode layers. The insulation layer is disposed between the first conductive layer and the second conductive layer. The second conductive layer is disposed between the first conductive layer and the third conductive layer. The first conductive layer, the second conductive layer and the third conductive layer are electrically insulated from one another. The compressible dielectric layer is disposed between the second conductive layer and the third conductive layer.

To achieve the above object, the present invention further provides a force sensing method of a touch display device. The touch display device is first provided. The touch display device includes a touch display panel, a backlight circuit and a force sensor. The touch display panel includes a display surface and a back surface that are opposite each other. The backlight circuit is disposed on the back surface. The force sensor includes a first conductive layer, a second conductive layer, an insulation layer, a third conductive layer and a compressible dielectric layer. The first conductive layer is disposed between the touch display panel and the backlight circuit, and includes a plurality of first electrode strips. The second conductive layer is disposed between the first conductive layer and the backlight circuit, and includes a plurality of second electrode strips that intersect the first electrode strips. The insulation layer is disposed between the first conductive layer and the second conductive layer. The backlight circuit is disposed between the second conductive layer and the third conductive layer. The first conductive layer, the second conductive layer and the third conductive layer are electrically insulated from one another. The compressible dielectric layer is disposed between the second conductive layer and the third conductive layer, and has a first thickness before it is deformed. Before the force sensor is pressed, a plurality of driving signals are respectively provided to the first electrode strips, a plurality of first capacitance signals are respectively received from the second electrode strips, and the third conductive layer is electrically connected to a reference voltage. When a press on at least one position of the force sensor causes the first thickness of the compressible dielectric layer corresponding to this position to become a second thickness, the driving signals are again respectively provided to the first electrode strips, and at least one second capacitance signal is received from at least one second electrode strip corresponding to this position. The first capacitance signals and the second capacitance signal of the second electrode strips are compared to obtain at least one pressing force value.

With the mutual capacitive force sensor provided, the touch display device of the present invention provides a touch sensing function as well as a force sensing function. Moreover, the mutual capacitive force sensor of the present invention is capable of detecting not only a force of a single-point press but also a force of a multi-point press. Therefore, in addition to performing a multi-touch function on the touch display device, a user is also enabled to perform multiple instructions in a one-time touch operation to further increase the number of functions achievable by a one-time touch operation.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
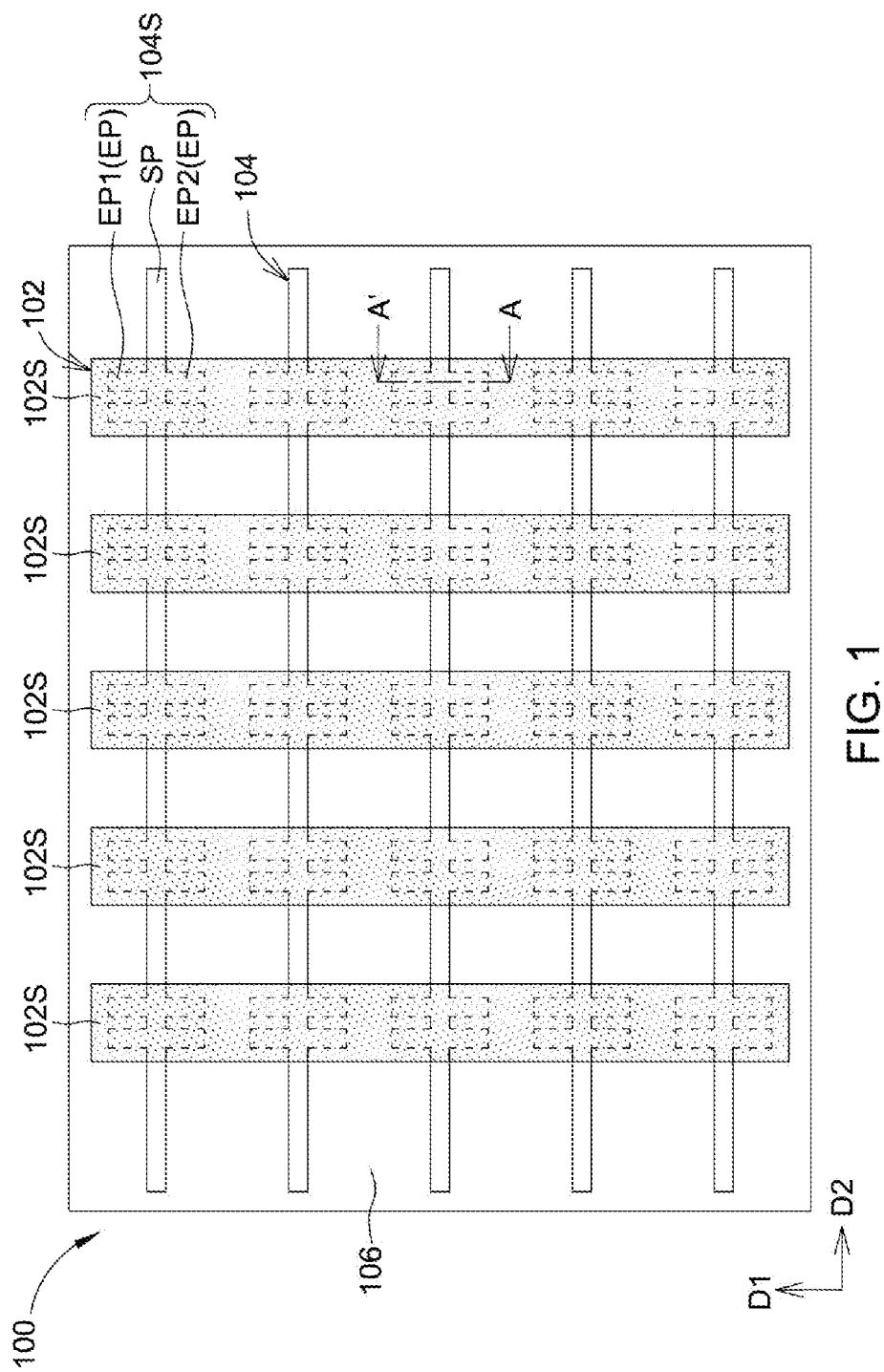
FIG. 1 is a top view of a mutual capacitive force sensor according to a first embodiment of the present invention.
Figure 2:
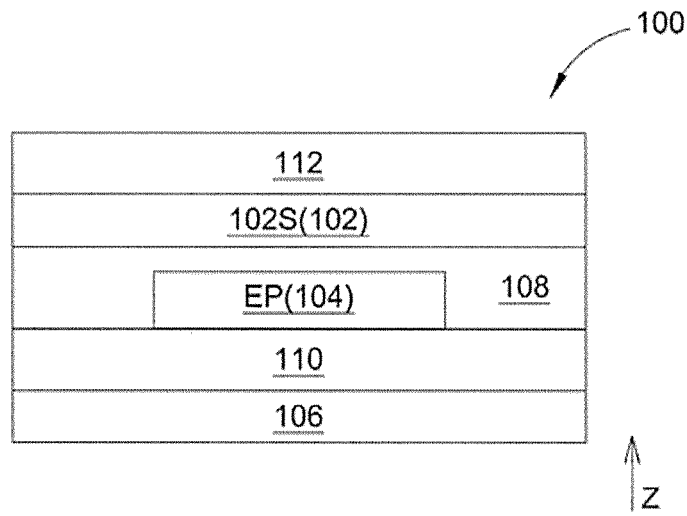
FIG. 2 is a section view along a section line A-A' in FIG. 1.

FIG. 1 shows a top view of a mutual capacitive force sensor according to a first embodiment of the present invention. FIG. 2 shows a section view along a section line A-A' in FIG. 1. As shown in FIG. 1 and FIG. 2, a mutual capacitive force sensor 100 of the embodiment includes a first conductive layer 102, a second conductive layer 104, a third conductive layer 106, an insulation layer 108 and a compressible dielectric layer 110. The first conductive layer 102, the insulation layer 108, the second conductive layer 104, the compressible dielectric layer 110 and the third conductive layer 106 are sequentially formed on a surface of a substrate 112. For example, the substrate 112 may include a hard substrate such as a glass substrate, a cover lens and a cover glass, a flexible substrate and/or a film substrate such as a plastic substrate, or a substrate formed by other appropriate materials. Alternatively, the substrate 112 may be an electronic device such as a touch display panel. In this embodiment, the first conductive layer 102 includes a plurality of first electrode strips 102S respectively disposed along a first direction D1, and the second conductive layer 104 includes a plurality of second electrode strips 104S respectively disposed along a second direction D2 that is different from the first direction D1, such that the second electrode strips 104S intersect the first electrode strips 102S. The insulation layer 108 is disposed between the first conductive layer 102 and the second conductive layer 104, and electrically insulates the first conductive layer 102 from the second conducive layer 104. Thus, each of the first electrode strips 102S couples each of the second electrode strips 104S to form coupling capacitance at the intersection. The second conductive layer 104 is disposed between the first conductive layer 102 and the third conductive layer 106, and the compressible dielectric layer 110 is disposed between the second conductive layer 104 and the third conductive layer 106. Thus, the second conductive layer 104 may be electrically insulated from the third conductive layer 106. The compressible dielectric layer 110 not only electrically insulates the second conductive layer 104 and the third conductive layer 106 but also provides compressibility. Thus, when the mutual capacitive force sensor 100 is pressed, the thickness of the compressible dielectric layer 110 is changed, such that a detected value of the coupling capacitance between the first electrode strip 102S and the second electrode strip 104S varies as the thickness of the compressible dielectric layer 110 changes, and a magnitude of the press may then be calculated according to the change in the capacitance. For example, the compressible dielectric layer 110 includes air or an elastic material.

In this embodiment, each of the second electrode strips 104S may selectively include a strip portion SP that intersects the first electrode strips 102S. Further, each of the second electrode strips 104S may selectively include a plurality of extension portions EP respectively extending from at least one side of the strip portion SP. More specifically, the extension portions EP may include first extension portions EP1 and second extension portions EP2 respectively extending from two opposite sides of the strip portion SP. Preferably, each of the first extension portions EP1 and the corresponding second extension portion EP2 may be disposed on the same straight line, such that the strip portion SP, the first extension portions EP1 and the second extension portions EP2 may form a trellis structure. However, the present invention is not limited to the above example, and each of the first extension portions EP1 and the corresponding second extension portion EP2 may also be in line symmetry with the strip portion SP but not disposed on the same straight line. For example, an intersection of each second electrode strip 104S and each first electrode strip 102S may have two extension portions EP. These two extension portions EP are respectively the first extension portion EP1 and the corresponding second extension portion EP2 that are in line symmetry with the strip portion SP but not disposed on the same straight line, and are in line symmetry with a straight line perpendicular to the strip portion SP, such that a more even and greater sensing amount may be measured around the intersection of each second electrode strip 104S and each first electrode strip 102S. Further, the first electrode strips 102S may be driving electrodes each transmitting a driving signal, and the second electrode strips 104S may be sensing electrodes mutually capacitance coupled with the respective first electrode strips 102S, so as to generate capacitance signals to be sensed. Through detecting the change in the capacitance signal, the changes in the coupling capacitance between the second electrodes strips 104S and the first electrodes trips 102S can be detected. Preferably, a width of the first electrodes strips 102S may be greater than a width of the strip portions SP, so that the first electrode strips 102S serving as driving electrodes may shield signal interference that is generated by or above the substrate 112 to enhance the sensitivity of force sensing. Further, at least one extension portion EP of each of the second electrode strips 104S may overlap one first electrode strip 102S in a perpendicular projection direction Z. As such, not only the first electrode strip 102S may shield the extension portion EP, but also the coupling capacitance between the first electrode strip 102S and the second electrode strip 104S may be increased. In this embodiment, for example but not limited to, two first extension portions EP1 and two second extension portions EP2 of each second electrode strip 104S overlap the same first electrode strip 102S. In another embodiment, the second conductive layer 104 may further include a plurality of floating electrodes, which are respectively disposed between two adjacent second electrode strips 104S and are separated from the second electrode strips 104S to be in a floating state. With the floating electrodes provided, capacitance signals sensed by the second electrode strip 104S may be increased to further increase the amount of sensing signals. It can be understood that, the first electrode strips 102S may be sensing electrodes and the second electrode strips 104S may be driving electrodes, and associated operations are similar to the details given above and shall be omitted herein.

The third conductive layer 106 may be a planar electrode, which is electrically connected to a reference voltage, e.g., a ground voltage, and covers the first conductive layer 102 and the second conductive layer 104, in a way that each intersection of the first electrode strips 102S and the second electrode strips 104S may overlap the third conductive layer 106 in the perpendicular projection direction Z, thereby allowing the coupling capacitance at each intersection to be individually affected by the third conductive layer 106 when pressed. More specifically, a predetermined distance may exist between the third conductive layer 106 and the second conductive layer 104, such that the third conductive layer 106 is located at a same distance from all of the positions of the coupling capacitance when not pressed and the capacitance signals sensed by the second electrode strips 104S are substantially equal. When the mutual capacitive force sensor 100 is pressed, the distance between the second electrode strip 104S corresponding to the pressed position and the third conductive layer 106 is reduced, such that the capacitance signal sensed by the second electrode strip 104S is also changed due to the effect of the reference voltage of the third conductive layer 106, and the magnitude of the press can be further detected. Associated operation details are given in the force sensing method of the touch display device in the following description.

Figure 3:
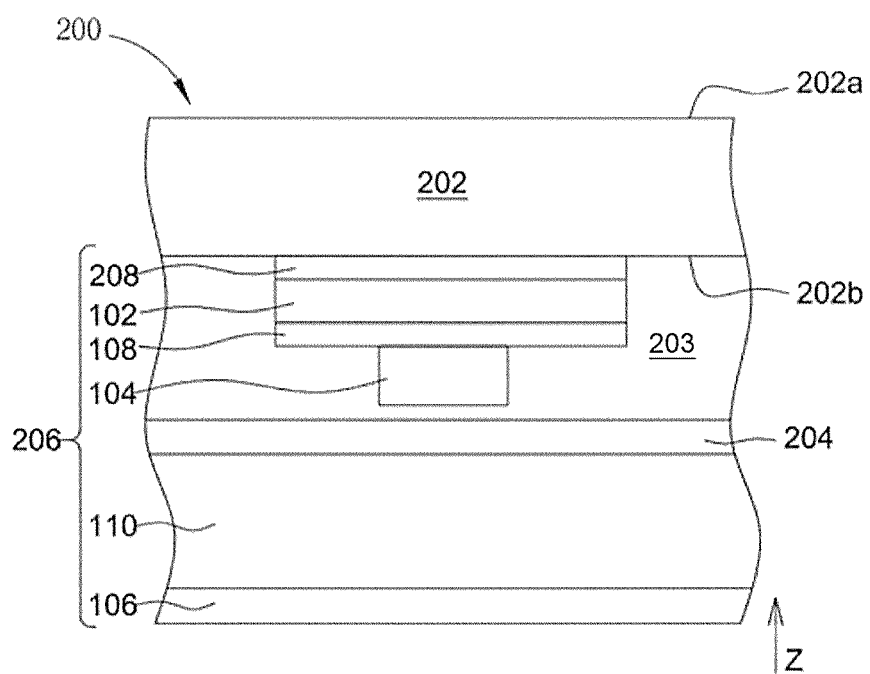
FIG. 3 is a section view of a touch display device having a force sensing function according to a second embodiment of the present invention.

The mutual capacitive force sensor of the present invention is applicable to a touch display device to coordinate with a touch function to thereby perform multiple instructions in a one-time touch operation. FIG. 3 shows a section view of a touch display device supporting force sensing according to a second embodiment of the present invention. As shown in FIG. 3, a touch display device 200 of the embodiment may include a touch display panel 202, a backlight circuit 204 and a force sensor 206. The touch display panel 202 includes a display surface 202a and a back surface 202b that are opposite to each other. The touch display panel 202 may be, for example, a liquid crystal display (LCD) panel with a touch function, and may include in-cell/on-cell, out-cell and hybrid in-cell touch panels to provide the touch display device 200 with a touch sensing function. The present invention is not limited to the above examples. One person skilled in the art should know that, the touch panel may be a resistive, magnetic or optical touch panel, or other types of touch panels. The backlight circuit 204 is disposed below the back surface 202b of the touch display panel 202, and serves as a light source of the touch display panel 202 to display images. For example, the backlight circuit 204 may be a side-light backlight circuit or a direct down backlight circuit.

In this embodiment, the force sensor 206 may include a first conductive layer 102, a second conductive layer 104, a third conductive layer 106, an insulation layer 108 and a compressible dielectric layer 110. The first conductive layer 102 is disposed on the back surface 202b between the touch display panel 202 and the backlight circuit 204. The second conductive layer 104 is disposed between the first conductive layer 102 and the backlight circuit 204. The insulation layer 108 is disposed between the first conductive layer 102 and the second conductive layer 104, and may include an optical adhesive to adhere the second conductive layer 104 onto the first conductive layer 102 and electrically insulating the first conductive layer 102 from the second conductive layer 104. The first conductive layer 102, the insulation layer 108 and the second conductive layer 104 are adhered on the back surface 202b of the touch display panel 202. For example, the first conductive layer 102 and the second conductive layer 104 may first be respectively formed on a thin film, and the thin film having the second conductive layer 104 is then adhered to the thin film of the first conductive layer 102 through the insulation layer 108. The force sensor 206 may further include an adhesive layer 208, e.g., an optical adhesive, to adhere the thin film having the first conductive layer 102 onto the back surface 202b of the touch display panel 202. In an alternative embodiment, the first conductive layer 102 may also be directly formed on the back surface 202b of the touch display panel 202 by a micro-etching or screen printing process. The insulation layer 108 may include an organic or inorganic material, and is formed on the first conductive layer 102. The second conductive layer 104 may be directly formed on the insulation layer 108 by another micro-etching or screen printing process. In this embodiment, preferably, the first conductive layer 102 and the second conductive layer 104 may respectively include a transparent conductive material to prevent and block light beams of the backlight circuit 204 from entering the touch display panel 202 and also to reduce the effect that light beams of the backlight circuit 204 have on image brightness of the touch display device 200. In this embodiment, structures of the first conductive layer 102, the second conductive layer 104 and the third conductive layer 106 are identical to those of the first embodiment, and shall be omitted herein.

Furthermore, the third conductive layer 106 is disposed below the backlight circuit 204, i.e., the backlight circuit 204 is disposed between the second conductive layer 104 and the third conductive layer 106. It should be noted that, the third conductive layer 106 may be mounted on a securing member or be a securing member, and the touch display panel 202 is a hard carrier board to accordingly support and secure the first conductive layer 102, the insulation layer 108 and the second conductive layer 104 adhered thereon. Thus, when the touch display device 200 is not pressed, a predetermined distance, which is even and consistent, exists between the third conductive layer 106 and the second conductive layer 104. For example, the third conductive layer 106 may be a metal frame for accommodating the touch display panel 202, the backlight circuit 204, and the first conductive layer 102 and the second conductive layer 104 between the two. Furthermore, the third conductive layer 106 may be electrically connected to a lowest voltage of the system of the touch display device 200, e.g., a ground voltage or a common voltage. It should be noted that, when the backlight circuit 204 is flexible, the first conductive layer 102, the insulation layer 108, the second conductive layer 104 and the third conductive layer 106 cannot be fixed on the backlight circuit 104, so as to prevent any change in the distance between the third conductive layer 106 and the second conductive layer 104 when the touch display device 200 is not pressed. Furthermore, the compressible dielectric layer 110 is disposed between the second conductive layer 104 and the third conductive layer 106, and includes air or an elastic material. For example, between the backlight circuit 204 and the third conductive layer 106 is an accommodating space, in a way that the compressible dielectric layer 110 may be air disposed in the accommodating space or an elastic material disposed in the accommodating space. In an alternative embodiment, the compressible dielectric layer 110 may also be air or an elastic material between the backlight circuit 204 and the second conductive layer 104.

It should be noted that, the first conductive layer 102, the insulation layer 108 and the second conductive layer 104 of the embodiment are disposed between the touch display panel 202 and the backlight circuit 204, so as to effectively reduce the space 203 between the backlight circuit 204 and the touch display panel 202, and to decrease the thickness increased due to the force sensor 206 provided. Thus, the increased thickness of the touch display device 200 integrated with the force sensor 206 may be minimized. Furthermore, by using a metal frame as the third conductive layer 106, an electrode having the reference voltage may be omitted to lower component costs.

Figure 4:
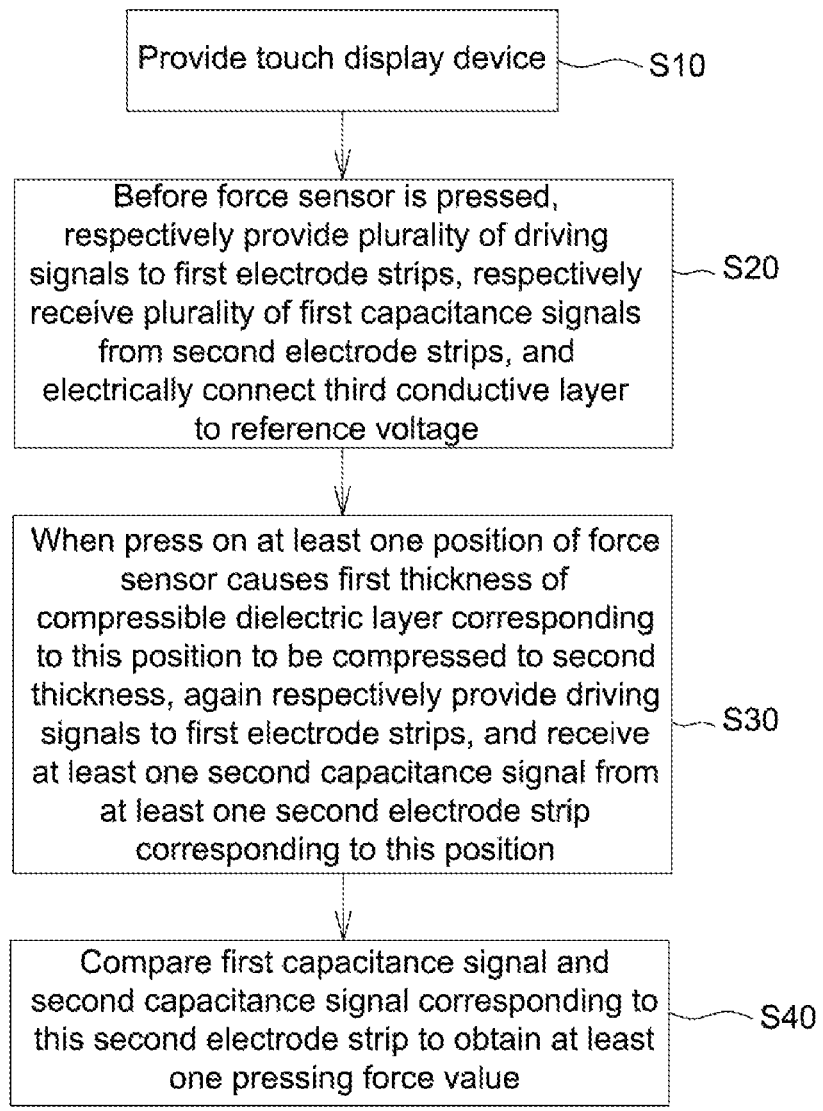
FIG. 4 is a flowchart of a force sensing method of a touch display device according to the second embodiment of the present invention.
Figure 5:
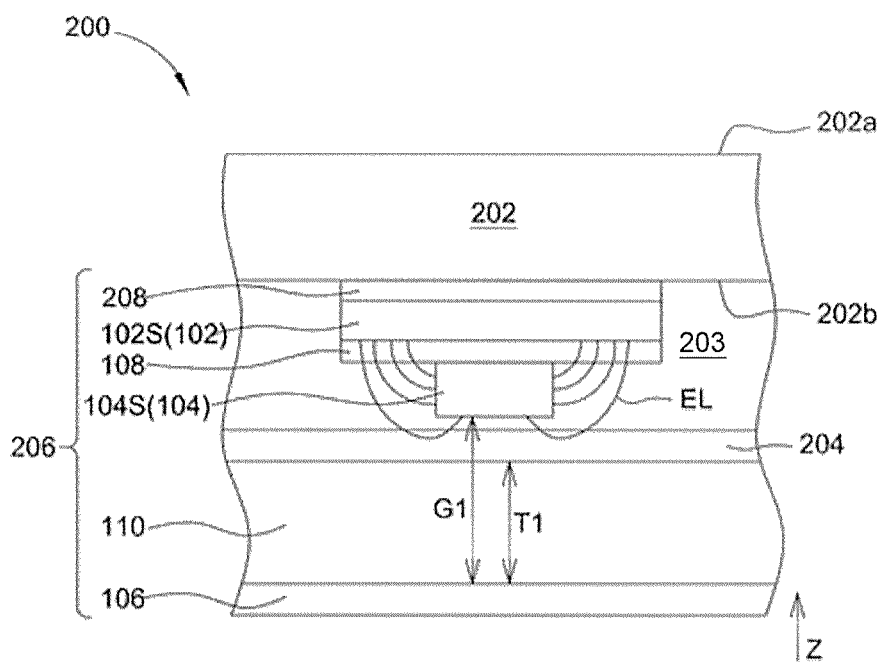
FIG. 5 is a state of a touch display device that is not yet pressed according to the second embodiment of the present invention.
Figure 6:
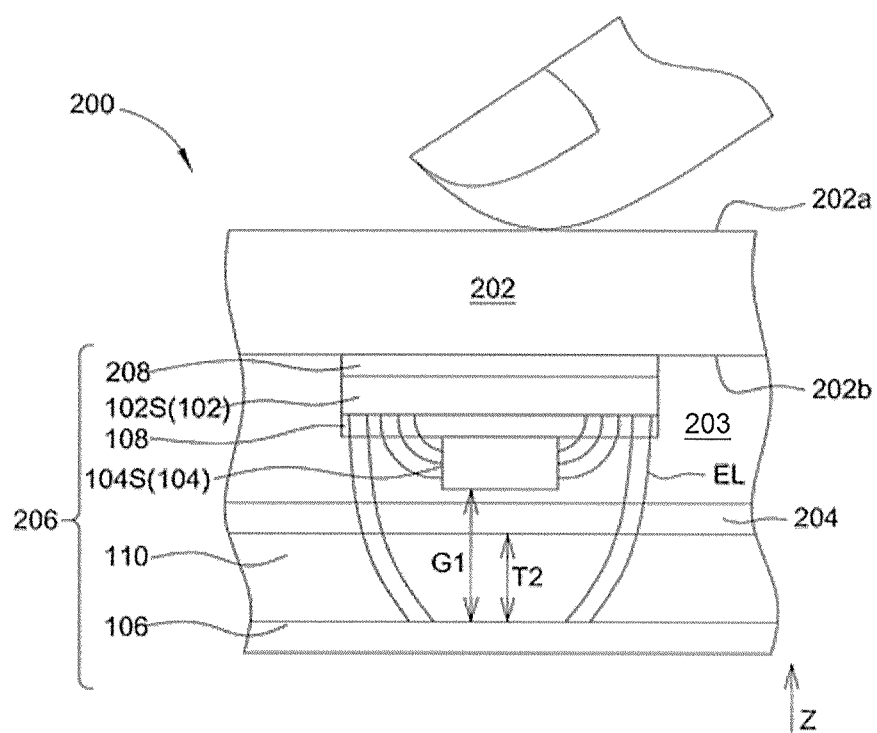
FIG. 6 is a state of a touch display device that is pressed according to the second embodiment of the present invention.

Details of a force sensing method of the touch display device 200 of the embodiment are further given below. FIG. 4 shows a flowchart of a force sensing method of the touch display device according to the second embodiment of the present invention. FIG. 5 shows a state of the touch display device that is not yet pressed according to the second embodiment of the present invention. FIG. 6 shows a state of the touch display device that is pressed according to the second embodiment of the present invention. Referring to FIGS. 4 to 6, step S10 is first performed to provide the touch display device 200. Details of the touch display device 200 are identical to those in the foregoing embodiment, and shall be omitted herein. Further, the compressible dielectric layer 110 has a first thickness T1 before deformation, as shown in FIG. 5. In step S20, when the force sensor 206 is not yet pressed, a plurality of driving signals are respectively provided to the first electrode strips 102S, a plurality of first capacitance signals are respectively received from the second electrodes strips 104S, and the third conductive layer 106 is electrically connected to a reference voltage. For example, the reference voltage is a ground voltage or a common voltage. More specifically, the driving signals are sequentially provided to the corresponding first electrode strips 102S, between each of the second electrode strips 104S and each of the first electrode strips 102S is a first coupling capacitance value when the force sensor 206 is not yet pressed, and so the driving signals can be sensed to further generate the first capacitance signals. Correspondingly, the second electrode strips 104S may sequentially sense the driving signals. Further, the second electrode strips 104S may be electrically connected to a control chip, so as to use the control chip to calculate the first coupling capacitance value through the first capacitance signals when the distance between the third conductive layer 106 and the second electrode strips 104S is a first distance G1.

As shown in FIG. 6, step S30 is then performed. When at least one position of the force sensor 206 is pressed in a way that the first thickness T1 of the compressible dielectric layer 110 corresponding to this position is compressed to a second thickness T2, the driving signals are again respectively provided to the first electrode strips 102S, and at least one second capacitance signal is received from the second electrode strip 104S corresponding to this position. More specifically, because the thickness of the compressible dielectric layer 110 is pressed to the second thickness T2 and the distance between the third conductive layer 106 and the second electrode strips 104S is reduced to a second distance G2, a part of power lines EL that the first electrode strips 102S generate on account of the transmitted driving signals are not sensed by the second electrode strips 104S, as they are affected by the reference voltage of the third conductive layer 106. Thus, the second capacitance signal that the second electrode strip 104S corresponding to the pressed position is different from the first capacitance signals. Through the control chip, a second coupling capacitance value when the distance between the third conductive layer 106 and the second electrode strips 104S is the second distance G2 can be calculated. In this embodiment, a plurality of positions of the force sensor 206 can be pressed when the force sensor 206 is pressed, and the control chip can respectively receive the plurality of second capacitance signals from the second electrode strips 104S corresponding to these positions.

Figure 7:
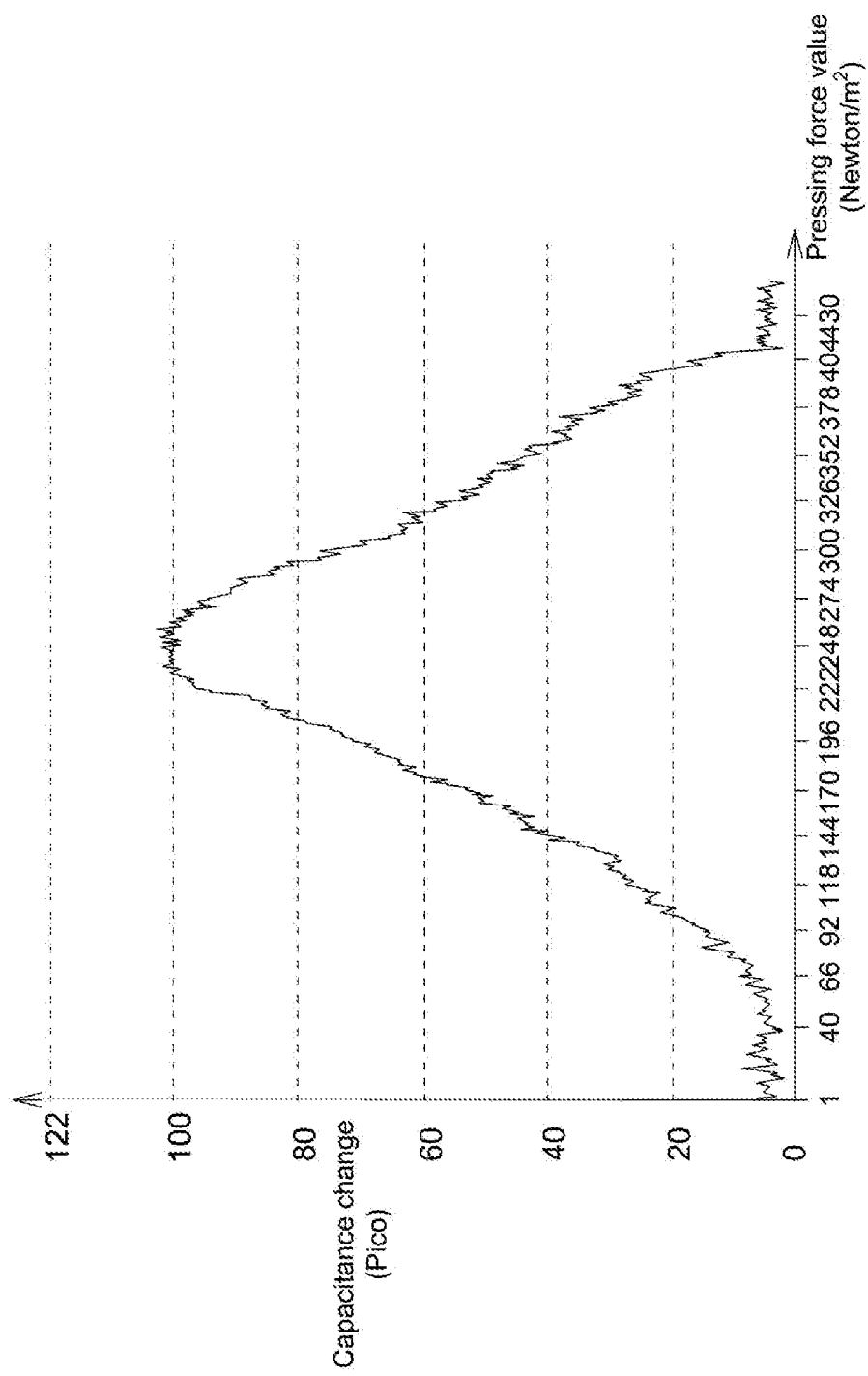
FIG. 7 is a schematic diagram of a relationship between a pressing force value and a capacitance change value according to an embodiment of the present invention.

Next, in step S40, the first capacitance signal and the second capacitance signal corresponding to this position are compared to obtain at least one pressing force value. At least one coupling capacitance value between the first conductive layer 102 and the second conductive layer 104 may be associated with at least one pressing force value. More specifically, the comparison between the first capacitance signal and the second capacitance signal of each position may be performed through the control chip, and a difference between the two for each position may be calculated. To be specific, a difference between the first coupling capacitance value obtained from the first capacitance value and the second coupling capacitance value may be directly calculated through the control chip. Because the difference between the first coupling capacitance value and the second coupling capacitance value is the capacitance change value, a first equation $\Delta C = \varepsilon A \Delta D / G1 G2$ is satisfied, where $\Delta C$ is the capacitance change value, A is an overlapping area of the second electrode strips 104S and the third conductive layer 106 in the perpendicular projection direction Z, G1 is the distance between the third conductive layer 106 and the second electrode strips 104S when the touch display device 200 is not pressed, G2 is the distance between the third conductive layer 106 and the second electrode strips 104S when the touch display device 200 is pressed, $\Delta D$ is a change value in the distance between the second electrode strips 104S and the third conductive layer 106, i.e., $\Delta D = G1 - G2$, and c is a dielectric constant between the second electrode strips 104S and the third conductive layer 106. Thus, according to the first equation and the capacitance change value, the change value in the distance between the second electrode strips 104S and the third conductive layer 106 can be calculated. In this embodiment, the thickness of the backlight circuit 204 between the second electrode strips 104S and the third conductive layer 106 does not change when pressed, the change value in the distance between the second electrode strips 104S and the third conductive layer 106 is then the difference between of the second thickness T2 and the first thickness T1 of the compressible dielectric layer 110. Furthermore, as the pressing force value satisfies a second equation: $F = \kappa \Delta D$, where F is the pressing force value, and $\kappa$ is an elasticity coefficient of the compressible dielectric layer 110, the control chip can calculate the difference between the second thickness T2 and the first thickness T1 according to the second equation to obtain the pressing force value. For example, FIG. 7 shows a relationship between the pressing force value and the capacitance change value. Different pressing force value ranges may be predefined for the touch display device 200 to correspondingly perform different instructions, and so the touch display device 200 can perform a corresponding instruction according to the pressing force value calculated, so as to perform a further instruction in a one-time touch operation of a user. In another embodiment, the elasticity coefficient κ of the compressible dielectric layer 110 may be compensated with a Gaussian curve based on different pressed positions and hence differ. Thus, the step of comparing the first capacitance signal with the second capacitance signal can obtain the pressing force value according to at least one elasticity coefficient κ of the compressible dielectric layer 110 corresponding to this position. For example, the elasticity coefficient κ increases as the position gets closer to a center of the touch display device 200 and decreases as the position gets closer to sides of the touch display device 200.

Figure 8:
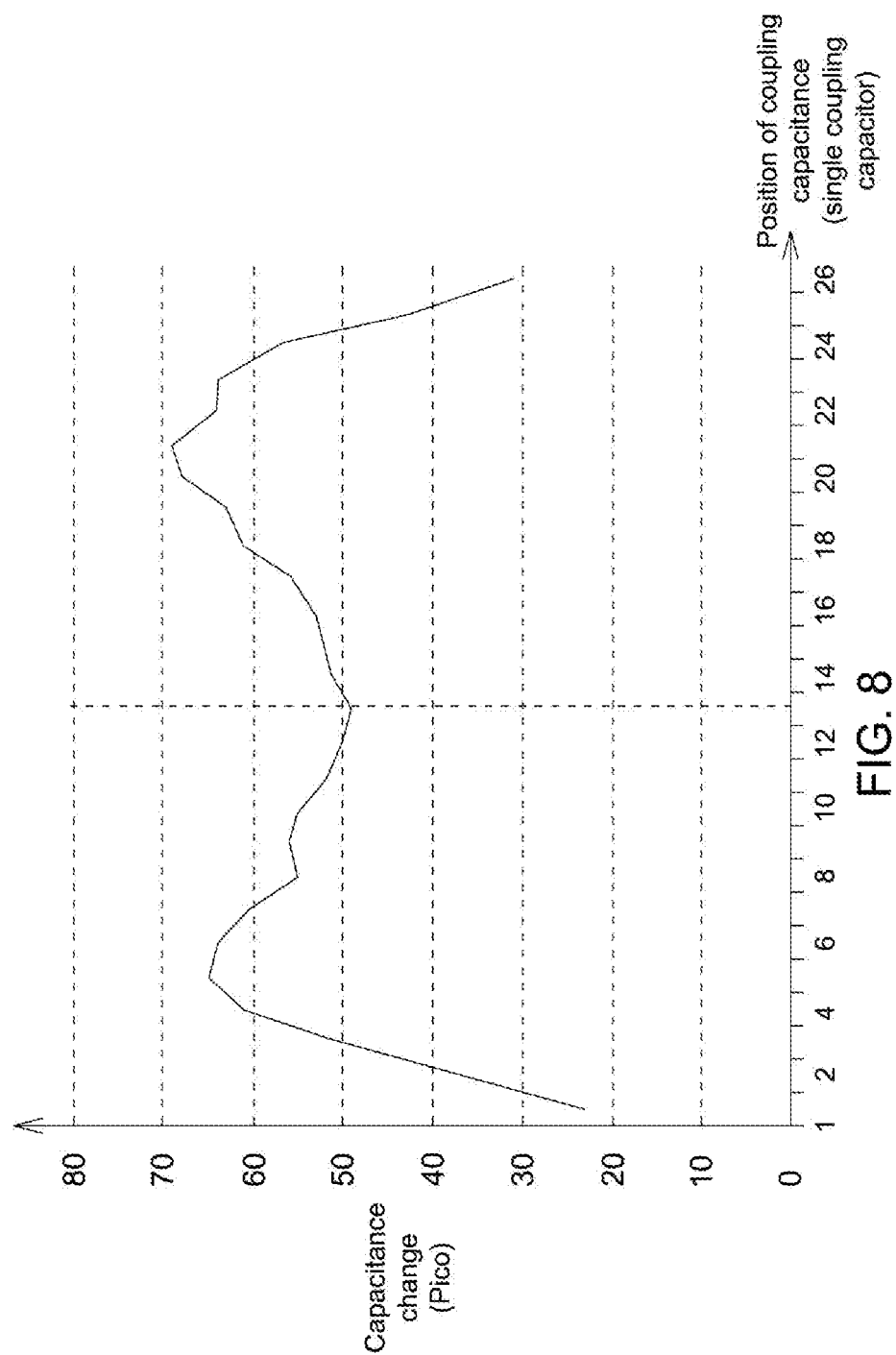
FIG. 8 is a schematic diagram of a relationship between a position of coupling capacitance and a capacitance change value when a touch display device is pressed by two touch objects.

In this embodiment, the force sensor 206 may be simultaneously pressed by a plurality of touch objects, and the control chip can respectively receive a plurality of second capacitance signals from the second electrode strips 104S corresponding to the positions that the touch objects press to determine respective pressing force values of the touch objects. FIG. 8 shows a schematic diagram of a relationship between a position of coupling capacitance and a capacitance change when a touch display device is pressed by two touch objects. As shown in FIG. 8, the sizes of the touch objects are greater than the range of one single position of coupling capacitance, thus one single touch object covers a plurality of positions of coupling capacitance. When the force sensor 206 is pressed by two touch objects, the control chip respectively receives a plurality of second capacitance signals from the second electrode strips 104S corresponding to the touch positions. Thus, a capacitance change distribution corresponding to different positions may be calculated through the step of comparing the first capacitance signals and the second capacitance signal to further calculate a pressing force value distribution corresponding to different positions. Furthermore, the control chip may learn that a pressing force value at a predetermined position is greater (i.e., a peak) than surrounding pressing force values to determine that the touch objects are located at positions with higher pressing force values as well as the pressing force values to further perform a corresponding instruction. As such, the touch display device 200 performs instructions corresponding to multiple touch points together with the touch sensing function of the touch display device 200, enabling a user to perform multiple instructions in a one-time touch operation, thereby increasing the number of intuitively achievable functions for the user. It should be noted that, when positions of at least two touch objects are close to each other, in order to identify whether the number of touch object touching the touch display device 200 is in a single or plural quantity, the control chip may calculate whether the capacitance change value is greater than a sum of capacitance change values in a predetermined minimum distribution range and to determine whether the sum of the capacitance change values exceeds a predetermined value, wherein the predetermined value may be a sum of capacitance change values of one single touch object. When the sum of the capacitance change values exceeds the predetermined value, it is determined that the touch display device 200 is pressed by at least two touch objects. Taking two touch objects for instance, in the pressing force value distribution, the pressing force values of two predetermined positions are greater than the surrounding pressing force values (i.e., peaks), and so the control chip may set the position having a lowest pressing force value between the two predetermined positions (i.e., the valley between the two peaks) as a separating point to separate the positions of the two touch objects, so as to further determine the press potions of the touch objects and the pressing force values. Therefore, compared to a self capacitive sensor, the mutual capacitive sensor 206 of the embodiment achieves pressing force value detection of a multi-point press. Further, by detecting the pressing force value using the mutual capacitive force sensor 206, not only the numbers of terminals (i.e., the number of pads) for transmitting and receiving signals can be reduced, but also the position distribution corresponding to the capacitance change value can be detected for one single touch object to further more accurately detect the pressing force value of the touch object.

In conclusion, with the mutual capacitive force sensor provided, the touch display device of the present invention provides not only a touch sensing function but also a force sensing function. Further, the mutual capacitive force sensor is capable of sensing the force of a single-point press as well as the force of a multi-point press. Therefore, in addition to performing a multi-touch function on the touch display device, a user is further enabled to perform multiple instructions in a one-time touch operation, thereby further increasing the number of intuitively achievable functions of a one-time touch operation.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display device having a force sensing function, comprising: a touch display panel, comprising a display surface and a back surface that are opposite to each other; a backlight circuit, disposed below the back surface, and having a space between the back surface of touch display panel and backlight circuit; and a force sensor, comprising: a first conductive layer, disposed between the touch display panel and the backlight circuit; a second conductive layer, disposed between the first conductive layer and the backlight circuit; an insulation layer, disposed between the first conductive layer and the second conductive layer; a third conductive layer, the backlight circuit disposed between the second conductive layer and the third conductive layer, the first conductive layer, the second conductive layer and the third conductive layer electrically insulated from one another; and a compressible dielectric layer, disposed between the second conductive layer and the third conductive layer, comprising one of air and an elastic material, wherein the force sensor measures at least one pressing force value, and at least one coupling capacitance between the first conductive layer and the second conductive layer is associated with the at least one pressing force value.

2. The touch display device having a force sensing function according to claim 1, wherein the first conductive layer comprises a plurality of first electrode strips, the second conductive layer comprises a plurality of second electrode strips, and the first electrode strips intersect the second electrode strips.

3. The touch display device having a force sensing function according to claim 2, wherein each of the second electrode strips comprises a strip portion and a plurality of extension portions, the extension portions extend from at least one side of the strip portion, and at least one of extension portions of the second electrode strips overlaps one of the first electrode strips.

4. The touch display device having a force sensing function according to claim 3, wherein a width of the first electrode strips is greater than a width of the strip portions.

5. The touch display device having a force sensing function according to claim 3, wherein the first conductive layer and the second conductive layer respectively comprise a transparent conductive material.

6. The touch display device having a force sensing function according to claim 2, wherein the first electrode strips are driving electrodes, and the second electrode strips are sensing electrodes.

7. The touch display device having a force sensing function according to claim 1, wherein the third conductive layer is a metal frame for accommodating the touch display panel, the backlight circuit and the force sensor.

8. The touch display device having a force sensing function according to claim 1, wherein the insulation layer is an optical transparent adhesive for adhering the second conductive layer on the first conductive layer.

9. The touch display device having a force sensing function according to claim 1, wherein the force sensor further comprises: an adhesive layer, disposed between the first conductive layer and the touch display panel, for adhering the first conductive layer on the back surface of the touch display panel.

10. A mutual capacitive force sensor, comprising: a first conductive layer, comprising a plurality of first electrode strips; a second conductive layer, comprising a plurality of second electrode strips that intersect the first electrode strips; an insulation layer, disposed between the first conductive layer and the second conductive layer; a third conductive layer, wherein the second conductive layer is disposed between the first conductive layer and the third conductive layer, and the first conductive layer, the second conductive layer and the third conductive layer are electrically insulated from one another; and a compressible dielectric layer, disposed between the second conductive layer and the third conductive layer; wherein, the plurality of second electrode strips respectively receive a plurality of capacitance signals and measure at least one pressing force value, and at least one coupling capacitance value between the first conductive layer and the second conductive layer is associated with the at least one pressing force value.

11. The mutual capacitive force sensor of claim 10, wherein each of the second electrode strips comprises a strip portion and a plurality of extension portions, the extension portions extend from at least one side of the strip portion, and at least one of extension portions of the second electrode strips overlaps one of the first electrode strips.

12. The mutual capacitive force sensor of claim 11, wherein a width of the first electrode strips is greater than a width of the strip portions.

13. The mutual capacitive force sensor of claim 10, wherein the third conductive layer is a planar electrode that covers the first electrode layer and the second conductive layer.

14. The mutual capacitive force sensor of claim 10, wherein the insulation layer is an optical transparent adhesive for adhering the second conductive layer on the first conductive layer, and the compressible dielectric layer comprises one of air and an elastic material.

15. The mutual capacitive force sensor of claim 10, generating a pressing force value distribution corresponding to different positions according to a plurality of capacitance values to achieve multi-point force touch control.

16. A force sensing method of a touch display device, comprising: provided to the touch display device, the touch display device comprising: a touch display, comprising a display surface and a back surface that are opposite each other; a backlight circuit, disposed below the back surface, and having a space between the back surface of touch display panel and backlight circuit; and a force sensor, comprising: a first conductive layer comprising a plurality of first electrode strips, disposed between the touch display panel and the backlight circuit; a second conductive layer, comprising a plurality of second electrode strips that intersect the first electrode strips, disposed between the first conductive layer and the backlight circuit; an insulation layer, disposed between the first conductive layer and the second conductive layer; a third conductive layer, the backlight circuit disposed between the second conductive layer and the third conductive layer, the first conductive layer, the second conductive layer and the third conductive layer electrically insulated from one another; and a compressible dielectric layer, disposed between the second conductive layer and the third conductive layer, having a first thickness before being deformed; when the force sensor is not yet pressed, respectively providing a plurality of driving signals to the first electrode strips, respectively receiving a plurality of capacitance signals from the second electrode strips, and electrically connecting the third conductive layer to a reference voltage; when at least one position of the force sensor is pressed in a way that the first thickness of the compressible dielectric layer is compressed to a second thickness, again respectively providing the driving signals to the first electrode strips, and receiving at least one second capacitance signal from at least one of the second electrode strips corresponding to the at least one position; and comparing the first capacitance signal and the at least one second capacitance signal of the at least one second electrode strip to obtain at least one pressing force value.

17. The force sensing method of a touch display device of claim 16, wherein the step of comparing the first capacitance signal and the at least one second capacitance signal of the at least one second electrode strip further comprises obtaining at least one capacitance change value, and the at least one pressing force value is positively correlated with the at least one capacitance change value corresponding to a same position.

18. The force sensing method of a touch display device of claim 16, wherein the step of comparing the first capacitance signal and the at least one second capacitance signal of the at least one second electrode strip further comprises obtaining the at least one pressing force value according to at least one elastic coefficient of the compressible dielectric layer corresponding to the at least one position.

* * * * *